Patented Nov. 6, 1951

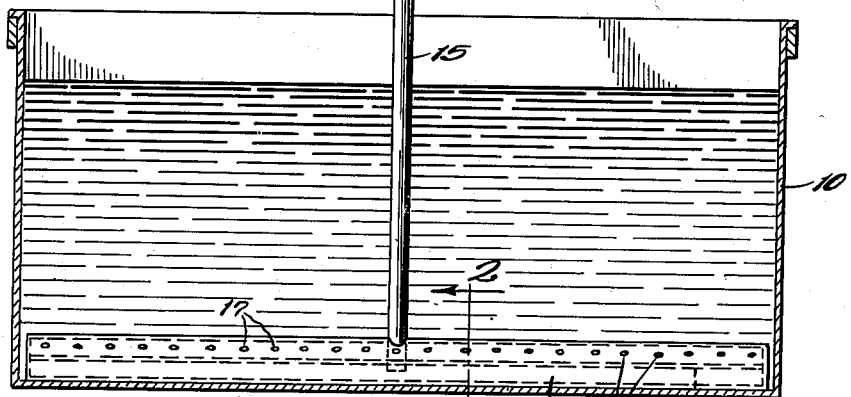
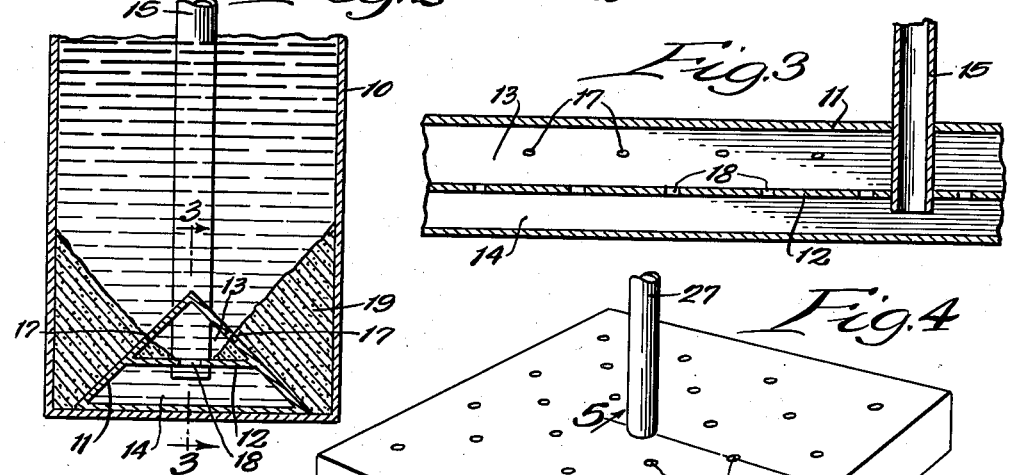
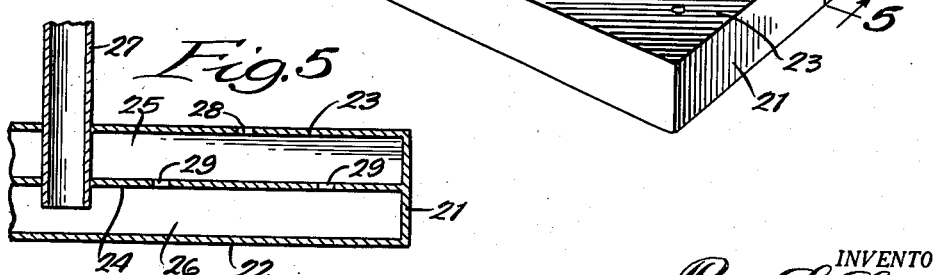

2,573,917

UNITED STATES PATENT OFFICE 2,573,917

SAND FEEDER

Roy L. Luce, Chicago, Ill., assignor to The Hydro-Blast Corporation, Chicago, Ill., a corporation of Illinois Application December 29, 1949, Serial No. 135,709

4 Claims. (Cl. 302—15)

This invention relates to sand feeders, and more particularly to devices for feeding a flowable mixture of water with sand or like granular material without clogging.

The patent Tirrell, 2,200,587, discloses and claims a sand feeding device which functions successfully to feed a flowable mixture of sand and water without clogging. However, in this device the sand is withdrawn from a tank or like container in a cone about the cylindrical casing of the feeder. Therefore, for effective use it is necessary to provide a relatively deep cylindrical tank so that the tank can be substantially emptied. In many cases it is desirable to employ a relatively shallow tank of substantial horizontal extent and the feeder of the Tirrell patent cannot be used effectively in a tank of this character.

It is accordingly one of the objects of the present invention to provide a feeder which will substantially empty the sand from a relatively large shallow tank.

Another object is to provide a feeder in which sand can be taken from the tank uniformly at a plurality of spaced points.

The above, and other objects and advantages of the invention, will be more readily apparent from the following description when read in connection with the accompanying drawing, in which:

Fig. 1 is a longitudinal section through a tank equipped with a feeder embodying the invention;

Fig. 2 is a partial enlarged section on the broken line 2—2 of Fig. 1;

Fig. 3 is a longitudinal section on the line 3—3 of Fig. 2;

Fig. 4 is a perspective view of a modified feeder construction; and

Fig. 5 is a partial section on the line 5—5 of Fig. 4.

As shown in Figs. 1, 2 and 3, the feeder is adapted to withdraw a flowable mixture of sand and water from an elongated rectangular tank 10. The feeder comprises a hollow pipe 11 which may be of triangular section, as shown in Fig. 2, lying in the bottom of the tank and substantially co-extensive in length with the tank. A horizontal partition 12 in the pipe 11 divides it into an upper chamber 13 and a lower chamber 14. A flowable mixture of sand and water may be withdrawn from the lower chamber 14 through an outlet pipe 15, communicating with the lower chamber and connected with a pump 16.

Sand and water can flow into the pipe 11 through a series of inlet openings 17 in the upper part of the pipe spaced along its length. As shown in Fig. 2, the openings 17 lie in the upper parts of the pipe side walls above the partition 11 to communicate with the upper chamber 13. The partition 12 is formed with a similar series of openings 18 staggered lengthwise relative to the openings 17, as seen in Fig. 3. The horizontal spacing between the openings 17 and 18 is such that when the sand is in repose in the water it cannot flow through the openings into the lower chamber 14. For this purpose the horizontal spacing between the openings 17 and 18 is at least as great as the vertical distance between them, times the tangent of the angle of repose of the sand. This condition is indicated in Fig. 2 wherein sand 19 in the lower part of the tank, when in repose, will build up on the partition 12 to close the openings 17 before it flows therefrom through the openings 18.

When sand and water is to be withdrawn, the pump 16 will start withdrawing the mixture from the chamber 14 and will cause an inflow of the water through the openings 17 and 18. This water will carry sand with it from the partition 12 through the openings 18 so that a substantially uniform mixture of sand and water will be supplied to the chamber 14 regardless of the depth of sand in the tank. This mixture will flow through the outlet pipe 15 and the action is such that sand and water will be drawn uniformly into the chamber 14, regardless of the fact that the openings 17 and 18 are spaced different distances from the outlet pipe. In the case of high flows where there might be a tendency to withdraw more through the openings closest to the outlet pipe, uniformity can be obtained by varying the sizes of the openings. In this way even with a relatively elongated narrow tank substantially all of the sand can be withdrawn therefrom.

For tanks which are wider the construction of Figs. 4 and 5 may be preferred. As shown in these figures, the feeder comprises a flat, hollow housing 21 having a flat bottom wall 22 to rest on the bottom of the tank, and a flat parallel top wall 23. An intermediate horizontal partition 24 is provided in the housing to divide it into an upper chamber 25 and a lower chamber 26. An outlet pipe 27 communicates centrally with the lower chamber.

The top housing wall 23 is formed with a series of inlet openings 28 spaced substantially uniformly over its surface through which sand and water may flow into the upper chamber 25. The partition 24 is provided with a similar series of spaced openings 29, staggered with respect to the openings 28 and spaced horizontally therefrom in amount such that in repose the sand cannot flow consecutively through the two sets of openings. In other words, the horizontal distances between openings 28 and 29 are at least as great as the vertical spacing between them, times the tangent of the angle of repose of the sand.

This construction functions in substantially the same manner as that of Figs. 1 to 3, but enables substantially the entire bottom of a relatively large shallow tank to be covered so that all of the sand can be effectively removed therefrom. Thus, with this construction there is no limitation on the size or shape of the sand tanks and efficient feeding can be obtained under almost any conditions.

While two embodiments of the invention have been shown and described, it will be understood that these are illustrative only, and are not to be taken as a definition of the scope of the invention, reference being had for this purpose to the appended claims.

What is claimed is:

1. A sand feeder for feeding a flowable mixture of sand and water from a tank comprising a hollow housing, an intermediate horizontal wall in the housing dividing it into an upper chamber and a lower chamber, an outlet connection from the lower chamber, the upper part of the housing being formed with a series of inlet openings communicating with the upper chamber and spaced different distances from the outlet connection, and the intermediate wall being formed with a series of openings spaced horizontally from the inlet openings an amount at least as great as the vertical distance between the intermediate wall and the inlet openings times the tangent of the angle of repose of wet sand.

2. A sand feeder for feeding a flowable mixture of sand and water from a tank comprising a relatively shallow housing of substantially greater length than depth, an intermediate horizontal wall in the housing dividing it into an upper chamber and a lower chamber, an outlet connection from the lower chamber, the upper part of the housing being formed with a series of inlet openings communicating with the upper chamber and spaced different distances from the outlet connection, and the intermediate wall being formed with a series of openings spaced horizontally from the inlet openings an amount at least as great as the vertical distance between the intermediate wall and the inlet openings times the tangent of the angle of repose of wet sand.

3. A sand feeder for feeding a flowable mixture of sand and water from a tank comprising an elongated tubular housing of substantially the same length as the tank adapted to fit horizontally in the bottom of the tank, an intermediate horizontal wall in the housing dividing it into an upper chamber and a lower chamber, an outlet connection from the lower chamber, a series of inert openings, spaced along the upper part of the housing and communicating with the upper chamber, and a series of openings in the intermediate wall spaced horizontally from the inlet openings an amount at least as great as the vertical distance between the inlet openings and the intermediate wall times the tangent of the angle of repose of wet sand.

4. A sand feeder for feeding a flowable mixture of sand and water from a tank comprising a shallow housing having flat parallel top and bottom walls, a horizontal intermediate wall in the housing dividing it into upper and lower chambers, an outlet connection to the lower chamber, a series of spaced inlet openings in the top housing wall, and a series of openings in the intermediate wall spaced horizontally from the inlet openings an amount at least as great as the vertical distance between the inlet openings and the intermediate wall times the tangent of the angle of repose of wet sand.

ROY L. LUCE.

REFERENCES CITED

The following references are of record in the file of this patent:

UNITED STATES PATENTS

| Number | Name | Date |
| --- | --- | --- |
| 2,200,587 | Tirrell | May 14, 1940 |
| 2,366,763 | Wieland | Jan. 9, 1945 |
| 2,372,957 | Keefer | Apr. 3, 1945 |

FOREIGN PATENTS

| Number | Country | Date |
| --- | --- | --- |
| 256,356 | Germany | Feb. 8, 1913 |